(12) United States Patent
Arnold et al.

(10) Patent No.: US 10,525,609 B2
(45) Date of Patent: Jan. 7, 2020

(54) SPIRAL CUTTING APPARATUS

(71) Applicant: VEGGIE NOODLE CO., LLC, Sunset Valley, TX (US)

(72) Inventors: Mason Arnold, Sunset Valley, TX (US); Christopher Tyson Self, Austin, TX (US); David Kogan, Austin, TX (US)

(73) Assignee: VEGGIE NOODLE CO., LLC, Sunset Valley, TX (US)

( * ) Notice: Subject to any disclaimer, the term of this patent is extended or adjusted under 35 U.S.C. 154(b) by 0 days.

(21) Appl. No.: 15/650,742

(22) Filed: Jul. 14, 2017

(65) Prior Publication Data

US 2018/0015623 A1 Jan. 18, 2018

Related U.S. Application Data

(60) Provisional application No. 62/363,770, filed on Jul. 18, 2016.

(51) Int. Cl.
*B26D 3/11* (2006.01)
*B26D 1/03* (2006.01)
(Continued)

(52) U.S. Cl.
CPC ............... *B26D 3/11* (2013.01); *A47J 25/00* (2013.01); *B26D 1/03* (2013.01); *B26D 7/0666* (2013.01);
(Continued)

(58) Field of Classification Search
CPC .......... B26D 3/11; B26D 1/03; B26D 7/0666; B26D 2210/02; B26D 3/283;
(Continued)

(56) References Cited

U.S. PATENT DOCUMENTS 2,156,645 A * 5/1939 Waller .................. A47J 43/255
241/301
2,766,793 A * 10/1956 Duszynski ............. B26D 3/283
83/699.51
(Continued)

FOREIGN PATENT DOCUMENTS

DE 19807871 A1 * 8/1999 ............... B26D 1/29
EP 2815858 A1 * 12/2014 ............... B26D 3/11
(Continued)

OTHER PUBLICATIONS

Young, Lee W., "Patent Cooperation Treaty International Search Report and Written Opinion dated Nov. 28, 2017," Patent Cooperation Treaty Application No. PCT/US17/42434, Patent Cooperation Treaty, Nov. 28, 2017.
(Continued)

*Primary Examiner* — Evan H MacFarlane
(74) *Attorney, Agent, or Firm* — Lindauer Law, PLLC

(57) ABSTRACT

A cutting device for spiral cutting a vegetable includes a mounting surface that engages the vegetable and is rotated using a motor, which causes rotation of the vegetable. The mounting surface may be moved toward a cutting surface using a lever arm that transmits only a portion of a manual force applied to the lever arm in a direction toward the mounting surface, facilitating precise movement of the mounting surface and a consistent size and shape of the resulting vegetable strands. Movement of the vegetable relative to the cutting surface may pass the vegetable through a slotted blade and a secondary blade. The spacing of cutters in the slotted blade determines the width of vegetable strands produced by the cutting apparatus, while the placement of the secondary blade determines the thickness of the strands. The position of the secondary blade may be adjustable to control the thickness.

19 Claims, 8 Drawing Sheets

(51) Int. Cl.
  *B26D 7/06* (2006.01)
  *A47J 25/00* (2006.01)
(52) U.S. Cl.
  CPC ......... *B26D 2210/02* (2013.01); *Y10S 83/932* (2013.01)
(58) Field of Classification Search
  CPC ........ B26D 2003/285; B26D 2003/288; B26D 3/18; B26D 3/26; Y10T 83/6667; Y10T 83/023; Y10T 83/6585; Y10T 83/9493; Y10T 83/9495; Y10T 83/9498; Y10S 83/932; A47J 25/00
  See application file for complete search history.

(56) References Cited

U.S. PATENT DOCUMENTS

| | | |
|---|---|---|
| 3,706,242 A | 12/1972 | Wright et al. |
| 3,874,259 A | 4/1975 | Chambos et al. |
| 3,952,621 A | 4/1976 | Chambos |
| 4,114,664 A | 9/1978 | Cotton |
| 5,784,942 A | 7/1998 | Jones |
| 6,053,098 A | 4/2000 | Yamamoto |
| 9,731,428 B2 * | 8/2017 | Levine ..................... B26D 3/11 |
| 2005/0223869 A1 | 10/2005 | White |
| 2016/0046031 A1 * | 2/2016 | Rogers ..................... B26D 3/11 83/672 |
| 2017/0136644 A1 * | 5/2017 | Bagley ..................... B26D 1/03 |

FOREIGN PATENT DOCUMENTS

| | | | | |
|---|---|---|---|---|
| GB | 170290 | * | 8/1922 | ............. B26D 3/283 |
| WO | WO2015107432 | | 7/2015 | |

OTHER PUBLICATIONS

Wittmann-Regis, Agnes, "International Preliminary Report on Patentability dated Jan. 31, 2019", Patent Cooperation Treaty Application No. PCT/USl7/42434, Patent Cooperation Treaty, Jan. 31, 2019.

\* cited by examiner

SPIRAL CUTTING APPARATUS

CROSS-REFERENCE TO RELATED APPLICATIONS

This application claims priority to the U.S. provisional application for patent entitled "Cutting Apparatus", having the application Ser. No. 62/363,770, filed Jul. 18, 2016. Application Ser. No. 62/363,770 is incorporated by reference herein in its entirety.

BACKGROUND

Various devices for cutting vegetables or other objects include arrangements of blades that control the shape of the pieces that are cut, and structures for controlling the position and movement of the vegetable or blades.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
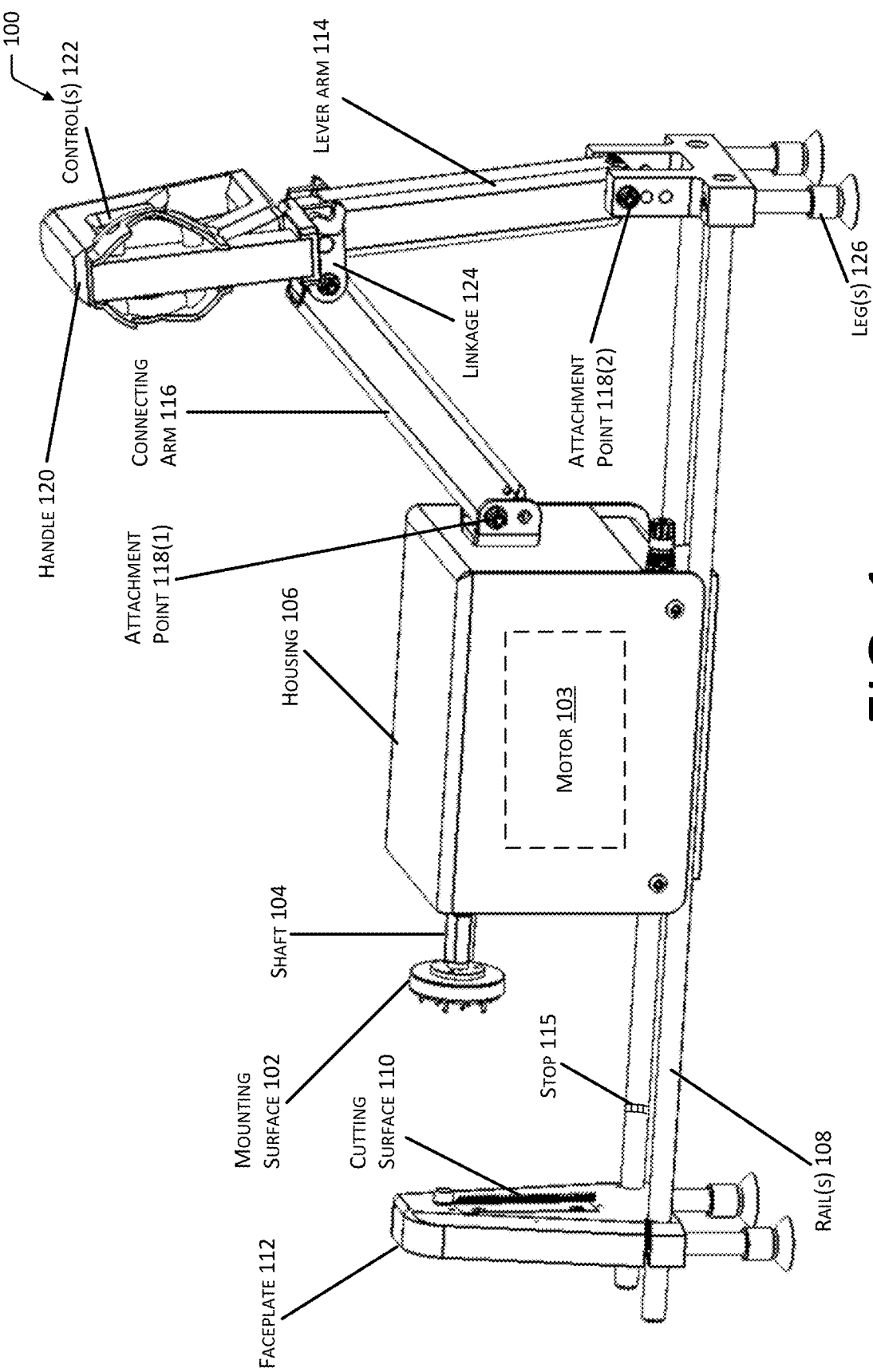
FIG. 1 depicts an implementation of a cutting apparatus within the scope of the present disclosure.

While implementations are described in this disclosure by way of example, those skilled in the art will recognize that the implementations are not limited to the examples or figures described. It should be understood that the figures and detailed description are not intended to limit implementations to the particular form disclosed, but on the contrary, the intention is to cover all modifications, equivalents, and alternatives falling within the spirit and scope as defined by the appended claims. The headings used in this disclosure are for organizational purposes only and are not meant to limit the scope of the description or the claims. As used throughout this application, the word "may" is used in a permissive sense (i.e., meaning having the potential to) rather than the mandatory sense (i.e., meaning must). Similarly, the words "include," "including," and "includes" mean "including, but not limited to".

DETAILED DESCRIPTION

To prepare a meal for consumption or for aesthetic purposes, many vegetables, fruits, meats, cheeses, and other types of ingredients, both cooked and raw, may be cut into various shapes, such as slices, diced chunks, and so forth. One method by which vegetables and other objects may be cut, to produce long, spiral-shaped strands, is known as "spiral cutting". For example, spiral cutting of vegetables, such as zucchini, butternut squash, sweet potatoes, beets, and so forth, may produce long strands of vegetable material that may be consumed in salads, soups, entrees, side dishes, in recipes as a substitute ingredient for types of pasta, and so forth. To spiral cut a vegetable, a cutting device having a slotted blade is typically used to slice the vegetable into parallel strands, as the vegetable is rotated through the slotted blade or the blade is rotated relative to the vegetable. A slotted blade typically includes multiple small, parallel blades, each spaced apart from one another by a fixed distance, such as two millimeters. The spacing between the adjacent blades of the slotted blade determines the width of the strands produced when cutting a vegetable or other object.

Many spiral cutting devices intended for personal use, such as within a residential home to prepare a meal for an individual or family, are manually operated devices. For example, a user may physically press a vegetable or other object against a slotted blade of a cutting device, and then rotate the vegetable or the cutting device to push the vegetable into and through the slotted blade. This process may be inefficient if a user intends to spiral cut a large quantity of vegetables or other foods, such as when preparing ingredients for use at a restaurant. Additionally, manual operation of a spiral cutting device may be physically tiring and difficult for users that lack sufficient strength, mobility, or endurance for continuous operation of hand tools. Furthermore, variances in grip, position, pressure, and so forth, inherent in the manual operation of a spiral cutting device may cause the strands of vegetable matter or other material that are produced to have varying shapes and thickness. An irregular or uneven shape may hinder even cooking of the strands and may negatively impact the physical appearance, mouthfeel, or texture of a meal prepared using the strands.

Some spiral cutting devices for industrial use may automatically feed vegetables through a slotted blade, such as through use of fluid jets, hydraulic or pneumatic presses, motor-driven presses, and so forth. In some cases, a motor or other non-manual source of force may be used to rotate vegetables relative to the slotted blade or to rotate the slotted blade relative to the vegetables. However, automated spiral cutting devices are typically large, non-portable, and constructed in a fixed location, which may make such devices unsuitable for use in a setting having limited floor space or counter space, such as a restaurant kitchen, or in other settings where portability of the device would be desirable. Additionally, automated spiral cutting devices are typically limited regarding variation in the pressure with which vegetables may be pressed through the slotted blade. For example, without significant reconfiguration, the same automated cutting device that is used to cut a firm vegetable, such as raw potatoes, may apply a pressure that is too large to effectively cut a softer vegetable, such as zucchini. Continuing the example, if the same force used to press a potato into and through a slotted blade is applied to a zucchini, the zucchini may be crushed against the cutting device rather than cut by the blades. Conversely, a force suitable for spiral cutting a zucchini, if applied to a potato, would fail to effectively cause a blade to penetrate through a potato to form spiral cut strands.

Described in this disclosure is a spiral cutting apparatus for use with vegetables, or other objects, that may combine both motor-driven and manually-driven elements, and that may be portably transported and mounted to various surfaces. While certain embodiments included in this disclosure may describe use of the spiral cutting apparatus in conjunction with vegetables as one example use, in other implementations, other objects, edible or inedible, may be cut in a similar manner. In some implementations, a motor may be used to rotate a vegetable relative to a cutting surface, while a user-applied manual force may be used to move the vegetable into and away from contact with the cutting surface. Use of a motor to provide rotational force may provide for increased efficiency and more uniformly-sized pieces of cut vegetable compared to use of manual spiral cutting devices. For example, use of a motor may prevent variations in the force and speed used to press a vegetable through a slotted blade, which may occur when manual force is used to rotate a vegetable through such a blade. Use of manual force to place a vegetable into contact with a cutting surface may allow larger variations in pressure applied to urge a vegetable against a cutting surface than what is typically attainable using automated devices, which may enable the same cutting apparatus to be used for any type of vegetable. In some implementations, the manner in which a manual force is applied may include use of a lever arm or other type of ergonomic handle that efficiently receives and applies the manual force while minimizing user fatigue and wasted effort. In other implementations, in place of a manual force, an adjustable motor, such as a linear motor, hydraulic actuator, pneumatic actuator, rack and pinion, and so forth, may be used.

Implementations described herein may include cutting devices that are lightweight and portable, such as devices that are removably mountable to a surface, through use of suction-based fasteners, magnetic-based fasteners, other types of removable fasteners (e.g., clips, clamps, screws), and so forth. For example, a chef at a restaurant may secure the cutting apparatus to a counter, prepare a desired quantity of spiral cut vegetables, then remove and store the cutting device such that the counter is available for other tasks. In some implementations, a mounting arm that contacts at least one side of the cutting apparatus may be secured to the surface upon which the cutting apparatus is mounted to prevent lateral movement of the cutting apparatus during use.

The cutting apparatus may include a mounting surface for retaining a vegetable. The mounting surface may be engaged with a motor-driven shaft, such that actuation of the motor rotates the shaft, the mounting surface, and a vegetable engaged with the mounting surface, about a rotational axis, such as the longitudinal axis of the shaft. For example, the mounting surface may include a circular or disc-shaped member having one or more features that are configured to engage an object. For example, the features may include spikes, spines, barbs, wedges, or other protruding members extending from the mounting surface, that may be used to at least partially penetrate into a vegetable to secure the vegetable to the mounting surface. In some implementations, the mounting surface may be removably engaged with the shaft to allow replacement thereof. For example, a small mounting surface used to retain and rotate a zucchini may lack sufficient surface area and protruding members for retaining and rotating a butternut squash. Continuing the example, the small mounting surface may be removed and replaced with a larger mounting surface adapted for retaining and rotating larger vegetables.

The cutting apparatus may also include a cutting surface for cutting the vegetable, which may be positioned opposite the mounting surface. In one implementation, the cutting surface may include a faceplate having a coring blade, a slotted blade, and a secondary blade. For example, the coring blade may be positioned approximately coaxial with the axis of the shaft that rotates the mounting surface. The slotted blade may be positioned radially outward from the coring blade, such as beneath the coring blade. The secondary blade may be positioned adjacent to the slotted blade, on a side opposite the cutting edges of the slotted blade. Brackets or other types of mounting structures or fasteners may be used to fixedly secure one or more of the blades to the faceplate, such that contact between the blade(s) and a vegetable does not cause significant movement of the blade(s) relative to the faceplate.

One or more of the motor, the shaft, or the mounting surface may be movable toward the cutting surface to cause the vegetable to contact one or more of the blades, such as by application of a manual force to the motor, shaft, mounting surface, or other attached structure. In one implementation, the motor may be at least partially enclosed in a movable housing coupled to rails, or another structure to facilitate movement of the housing in at least one direction. The rails may engage or extend toward the faceplate or other structure to which the blades are engaged. Movement of the motor housing along the rails may move the shaft, mounting surface, and attached vegetable or other object toward or away from the cutting surface. An arm, lever, handle, or similar manual member engaged with the motor housing may be used to move the motor housing along the rails, such as by applying a manual force thereto. The motor may be operated using one or more controls, which in some implementations may be positioned on the arm, such as on a handle portion thereof. Actuation of the motor may cause rotation of the mounting surface, via rotation of the shaft, causing rotation of the vegetable or other object attached to the mounting surface. A user-applied force to the arm may then be used to move the motor housing toward the cutting surface, such that the attached vegetable contacts one or more of the blades. For example, the coring blade may penetrate a central portion of the vegetable, and rotation of the vegetable about the axis of the coring blade may pass portions of the vegetable through the slotted blade, creating parallel slices of vegetable. The spacing of the cutting elements of the slotted blade may affect the width of the slices. Continued motion of the vegetable toward the faceplate (e.g., under a user-applied manual force) may press the vegetable slices that pass through the slotted blade against the secondary blade, which may cut the slices into strands that pass through a gap between the faceplate and the secondary blade. The position of the secondary blade relative to the faceplate may determine the size of the gap, which may control the thickness of the strands. In some implementations, the position of the secondary blade may be adjustable to modify the thickness of the strands. The strands that pass through the faceplate may be collected for use. In some implementations, one or more stops may be positioned on the rails, faceplate, or motor housing to limit movement of the motor housing and prevent contact between the mounting surface and the cutting surface.

In some implementations, the arm used to move the vegetable toward the cutting surface may be engaged to a portion of the motor housing within a threshold distance of the rails along which the housing travels. Engagement of the arm with a lower portion of the motor housing may prevent the entirety of a user-applied force from being transmitted in a direction parallel to the axis of the shaft. In other implementations, the arm may be angled relative to one or more of the rails or the motor housing such that only a portion of the user-applied force is transmitted in the direction parallel to the axis of the shaft. For example, if the entirety of a user-applied force were used to press a vegetable against the cutting surface, this excessive pressure may negatively affect the function of the cutting surface, damage the vegetable against the cutting surface, damage one or more portions of the cutting apparatus, and so forth. Additionally, small variations in the user-applied force during use may cause perceptible variations in the width of the resulting vegetable strands. By engaging the arm with the motor housing in a manner that transmits only a portion of the user-applied force to the vegetable, small variations in the user-applied force that occur during manual movement of the arm do not significantly affect the force at which the vegetable is pressed against the cutting surface and the resulting width of the vegetable strands.

FIG. 1 depicts an implementation of a cutting apparatus 100 that may be used within the scope of the present disclosure. The cutting apparatus 100 may include a mounting surface 102 to which a vegetable or other object may be secured. For example, the mounting surface 102 may include one or more protruding elements extending from a face. The protruding elements may be used to at least partially penetrate a vegetable or other object. In some implementations, the mounting surface 102 may include a circular or disc-shaped member having a first side coupled to a motor 103 via a shaft 104, and a second side having the protruding elements extending therefrom to engage a vegetable or other object. In some implementations, the shaft 104 may include an elongated member having a longitudinal axis aligned with the center of the mounting surface 102. The shaft 104 may have any cross-sectional shape including, without limitation, a circle, square, hexagon, or other polygonal shapes. In some implementations, the mounting surface 102 may be removably engaged with the shaft 104 to enable removal of the mounting surface 102 from the shaft 104 for replacement with a mounting surface 102 having different characteristics. For example, different removable mounting surfaces 102 may have different widths, thicknesses, arrangements of protruding elements, lengths of protruding elements, points of attachment relative to the shaft 104, and so forth. Continuing the example, a first mounting surface 102 may include dimensions and protruding elements configured to secure a small vegetable, such as a zucchini, while a second mounting surface 102 includes dimensions and protruding elements configured to secure a large vegetable, such as a butternut squash. The motor 103 may be used to provide a rotational force to the shaft 104, causing the shaft 104 to rotate about its longitudinal axis, which may in turn impart a rotational force to the mounting surface 102, causing rotation of the mounting surface 102 and the vegetable or object engaged therewith.

In some implementations, the motor may be at least partially enclosed by a motor housing 106 or other type of structure, which may protect the motor from contact with other objects, protect users from contact with moving parts of the motor, and provide points of attachment to couple the motor to other elements of the cutting apparatus 100. In other implementations, the motor housing 106 may be omitted, and other elements of the cutting apparatus 100 may be engaged with the motor directly. In still other implementations, the motor may include one or more flanges or other structures extending therefrom to which other elements of the cutting apparatus 100 may be engaged. FIG. 1 depicts a lower portion of the motor housing 106 engaged with two rails 108, along which the motor housing 106 and motor may be moved, such as under the application of a manual force by a user. While FIG. 1 depicts two cylindrical rails 108 along which the motor housing 106 may be moved, in other implementations, a single rail 108 or more than two rails 108 may be used. Additionally, rails 108 having other shapes or dimensions may be used, such as rails 108 having a square, rectangular, or other polygonal cross-sectional shape. In still other implementations, the rails 108 may be omitted, and any other arrangement of components that enables movement of the mounting surface 102 and an attached vegetable may be used. For example, the shaft 104 or mounting surface 102 may be movable outward from the motor housing 106 while the housing 106 remains generally stationary. As another example, the housing 106 may include protruding portions that travel within grooves, rails, or tracks. As yet another example, the housing 106 may include wheels or other friction-reducing elements on a surface thereof to facilitate movement of the housing 106. Movement of the motor housing 106 along the rails 108, or using other methods of movement, may move the motor, shaft 104, mounting surface 102, and an engaged vegetable toward or away from a cutting surface 110 that is shown mounted within a faceplate 112. For example, FIG. 1 depicts the rails 108 having a first end engaged to a lower portion of the faceplate 112 and a second end engaged to a lever arm 114 that may be used to apply a manual force to the motor housing 106. Continuing the example, the motor within the housing 106 may impart a rotational force to the shaft 104, which may in turn transmit the rotational force to the mounting surface 102, causing rotation of a vegetable or other object engaged to the mounting surface 102. A manual force applied by a user to the lever arm 114 may move the motor housing 106 and attached components toward the cutting surface 110, to bring a vegetable, rotated using the motor, into contact with the cutting surface 110. Contact between the vegetable and the cutting surface 110 may cause the blades of the cutting surface 110 to cut at least a portion of the vegetable to produce vegetable strands. Rotational force from the motor may move the vegetable through a slotted blade of the cutting surface 110, while manual force from the user may move the resulting vegetable strands through a gap in the faceplate 112 to bring additional portions of the vegetable into contact with a secondary blade of the cutting surface 110.

In some implementations, movement of the mounting surface 102 relative to the cutting surface 110 may be limited using one or more stops 115 to impede movement of one or more of the mounting surface 102, shaft 104, motor housing 106, motor, or lever arm 114. The stop(s) 115 may be used to prevent contact between the mounting surface 102 and the cutting surface 110 or faceplate 112, which may damage one or more of the mounting surface 102, cutting surface 110, or faceplate 112. For example, stops 115 may include elements that protrude from one or more of the rails 108 or elements configured to engage the rails 108, such as by placing one or more stops 115 around the circumference of a rail 108. In such a case, contact between a front end of the motor housing 106 and the stop(s) 115 may prevent the mounting surface 102 from contacting the cutting surface 110. In other implementations, one or more stops may be placed on the housing 106 or faceplate 112. For example, one or both of the motor housing 106 or the faceplate 112 may include an extension protruding therefrom that contacts the other of the motor housing 106 or the faceplate 112 to limit the proximity of the motor housing 106 to the faceplate 112. In still other implementations, one or more stops may be used to limit movement of the lever arm 114.

The lever arm 114 may be engaged with the motor housing 106 via a connecting arm 116. In other implementations, the lever arm 114 may be directly engaged with the motor housing 106, the motor, or another structure associated with the motor, such as a flange, extension, or protrusion associated with the motor. The connecting arm 116 is shown engaged with a sidewall of the motor housing 106, proximate to the point of engagement between the motor housing 106 and the rails 108. For example, an attachment point 118(1) between the connecting arm 116 and the motor housing 106 may be positioned below the axis of the shaft 104, within a threshold distance of the axis of the rails 108. In other implementations, the attachment point 118(1) may be positioned below the axis of the rails 108, such as by engagement with a protruding member or extension of the motor housing 106, motor, or another associated structure. The lever arm 114 may also be secured to the rails 108 or another structure associated with the body of the cutting apparatus 100 at a second attachment point 118(2). In some implementations, the connecting arm 116 and lever arm 114 may be configured to pivot or rotate about the attachment points 118 to enable the angles between the connecting arm 116, lever arm 114, and other portions of the cutting apparatus 100 to change during use. Use of the lever arm 114 to transmit manual forces to the motor housing 106 may cause a portion of a manual force applied to the lever arm 114 by a user to be directed in a vertical (e.g., downward) direction, while only a portion of the manual force is applied in a lateral direction (e.g., parallel to the axis of the shaft 104). The portion of the manual force that is applied in the lateral direction may be affected by the angle of the connecting arm 116 relative to the axis of the shaft 104. This reduction in the magnitude of the lateral component of a manual force applied to the lever arm 114 may facilitate production of vegetable strands having an even thickness. For example, a user may grasp a handle 120 of the lever arm 114 and actuate the motor using one or more controls 122 positioned on the handle 120. In other implementations, controls 122 for operation of the motor may be positioned on another portion of the cutting apparatus 100, or a separate control mechanism may be used, such as a remote controller or a computing device in wireless communication with the motor. Actuation of the motor may cause rotation of the shaft 104, mounting surface 102, and an engaged vegetable or other object. The user may apply a manual force to the lever arm 114 or connecting arm 116 (e.g., via the handle 120) to urge the housing 106 along the rails 108 toward the cutting surface 110. The placement of the attachment points 118 and the angles of the lever arm 114 and connecting arm 116, as well as the position of a linkage 124 between the lever arm 114 and connecting arm 116, may distribute the user-applied force in both vertical and horizontal directions to prevent small variations in the user-applied force from significantly affecting the force with which a vegetable contacts the cutting surface 110. If the entirety of a manual force were applied in a lateral direction (e.g., toward the cutting surface 110), small variations in the force may significantly affect the force between the vegetable and cutting surface 110, affecting the shape of the resulting vegetable strands and possibly crushing the vegetable or damaging the faceplate 112 or cutting surface 110. However, due to the use of the lever arm 114, variations in the manual force may result in only small variations to the contact between the vegetable and the cutting surface 110, which may not significantly affect the shape of the vegetable strands or the function of the cutting surface 110.

The cutting apparatus 100 may be positioned on or mounted to a support surface, such as a table or counter, using one or more legs 126. For example, FIG. 1 depicts the cutting apparatus 100 including four legs 126, each leg 126 positioned at an approximate corner of the cutting apparatus 100. In other implementations, different numbers and arrangements of legs 126 may be used, or legs 126 may be omitted entirely and other portions of the cutting apparatus 100 may contact or engage the support surface. In some implementations, the legs 126 or another portion of the cutting apparatus 100 may be configured to engage the cutting apparatus 100 to the support surface, such as suction-based fasteners, magnetic-based fasteners, mechanical fasteners (e.g., screws, clamps, clips, snaps, nails, rivets), adhesive-based fasteners, hook-and-loop fasteners, and so forth. Additionally, while FIG. 1 depicts the cutting apparatus 100 in a generally horizontal orientation, in other implementations, the support surface upon which the cutting apparatus 100 is placed may include an angled or vertical surface. For example, the cutting apparatus 100 may be positioned in a vertical orientation such that vegetable strands that pass through the faceplate 112 may fall downward into a container for collection. In some implementations, a vertically-oriented cutting apparatus 100 may include one or more structures, such as chutes, tubes, cones, and so forth, to facilitate use of gravity to center vegetables or other objects relative to the cutting surface 110.

Some implementations of the cutting apparatus 100 may include portable, lightweight devices. For example, the cutting apparatus 100 may have a size and weight configured to facilitate transport and storage. Continuing the example, the cutting apparatus 100 may be sufficiently lightweight to be lifted, transported, and secured to a support surface by a single user. Due to the lightweight nature of the cutting apparatus 100, the cutting apparatus 100 may be subjected to lateral forces that may move the cutting apparatus 100 relative to the support surface during use. In some implementations, the legs 126 or another portion of the cutting apparatus 100 may be engaged with the support surface, such as through use of suction, magnetism, mechanical fasteners, and so forth. In other implementations a support arm or another type of structure may be positioned in contact with at least one side surface of the cutting apparatus 100 to reduce lateral movement of the cutting apparatus 100 during use. The support arm or other structure may also engage the support surface, such as via use of one or more clamps or other types of fasteners. Use of a support structure that contacts a side of the cutting apparatus 100 may limit lateral movement of the cutting apparatus 100 in the direction of the support structure that may be caused by forces applied by a user, the motor, contact between the vegetable and the mounting surface 102 or cutting surface 110, and so forth. In some implementations, multiple support structures may be used to prevent movement of the cutting apparatus 100 in multiple directions.

Figure 2:
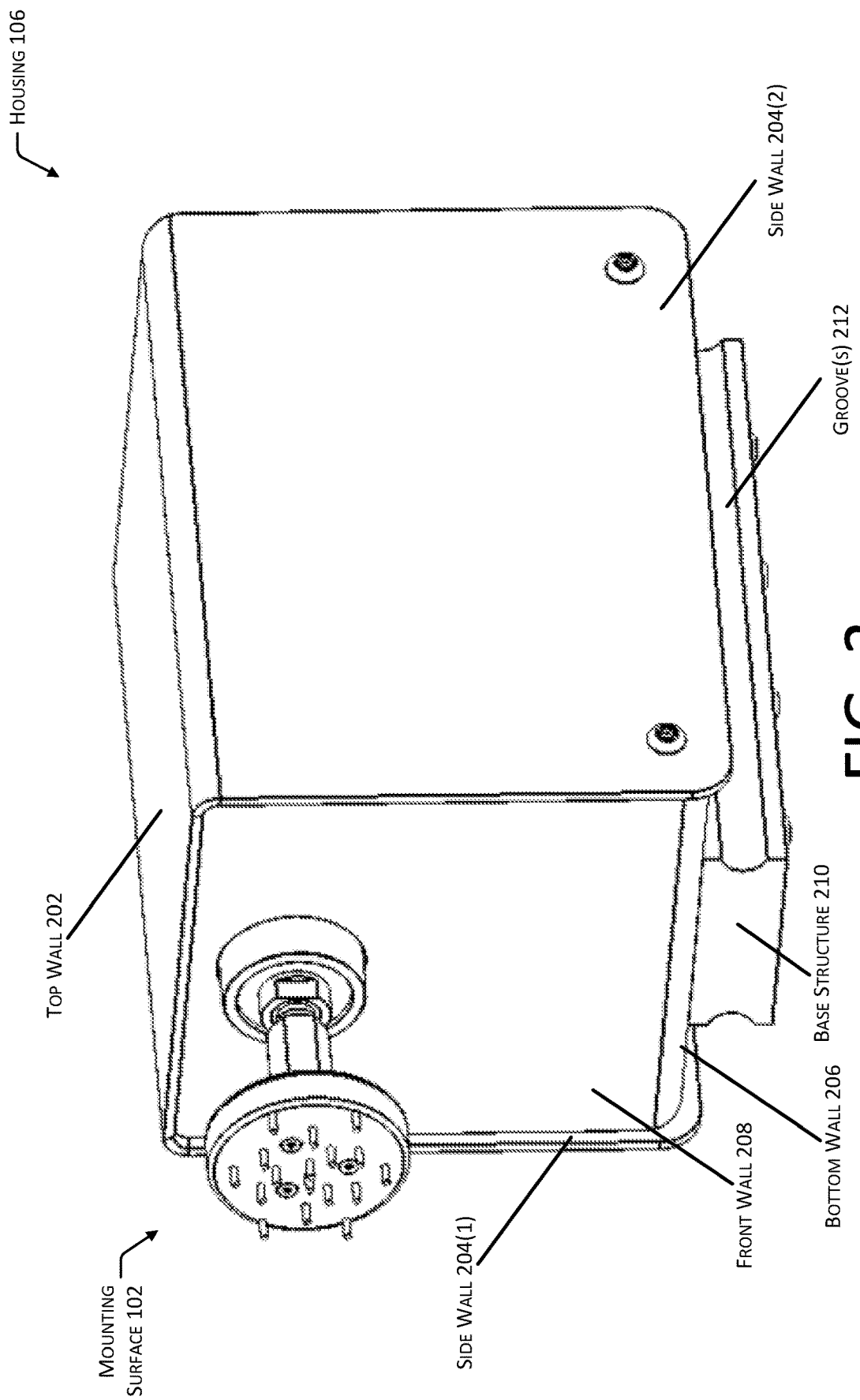
FIG. 2 depicts an implementation of the motor housing shown in FIG. 1.

FIG. 2 depicts an implementation of the motor housing 106 shown in FIG. 1. As described with regard to FIG. 1, in some implementations, the motor of the cutting apparatus 100 may be at least partially enclosed by a motor housing 106 or other type of structure, which may prevent contact between the motor and other objects and provide a structure having points of attachment to couple the motor to other elements of the cutting apparatus 100. For example, FIGS. 1 and 2 depict the housing 106 including a top wall 202, a first side wall 204(1), a second side wall 204(2), a bottom wall 206, a front wall 208, and a rear wall (not visible in FIG. 2). Each of the walls is shown positioned generally perpendicularly to each adjacent wall to provide the housing 106 with a generally rectangular shape. However, in other implementations, the housing 106 may include any number of walls and may have any shape, including a spherical, cylindrical, pyramidal, conical, or other polygonal prismatic shape. Additionally, in some implementations, one or more sides of the housing 106 may be open (e.g., lacking a wall), such as to enable access to the motor or other components within the housing 106. In other implementations, one or more sides of the housing 106 may be movable, removable, replaceable, and so forth to facilitate access to the interior of the housing 106 and to enable replacement of portions of the housing 106.

FIG. 2 depicts a base structure 210 engaged with the bottom wall 206 of the housing 106. The base structure 210 may be configured to engage the housing 106 with rails 108 or another type of structure that may enable movement of the housing 106 relative to one or more other portions of the cutting apparatus 100. For example, the base structure 210 is shown having two grooves 212 formed in opposing side surfaces thereof. The grooves 212 may have a shape complementary to the shape of the rails 108, such that the rails 108 may be at least partially contained within the grooves 212. Contact between the grooves 212 and the rails 108 may permit movement of the housing 106 in a first direction, such as along the axis of the rails 108, while limiting movement of the housing 106 in one or more other directions, such as laterally toward or away from the rails 108 or vertically relative to the rails 108. While FIG. 2 depicts the grooves 212 having a generally semi-circular cross-sectional shape that is complementary to the cylindrical shape of the rails 108 shown in FIG. 1, in other implementations, the grooves 212 may have any shape and may include any type of structure. For example, in place of grooves 212, the base structure 210 may include enclosed holes or channels shaped to accommodate the rails 108. Additionally, while FIG. 2 depicts two grooves 212, other implementations may include a single groove 212, hole, or other feature for providing movement to the housing 106, or three or more of such features.

Figure 3:
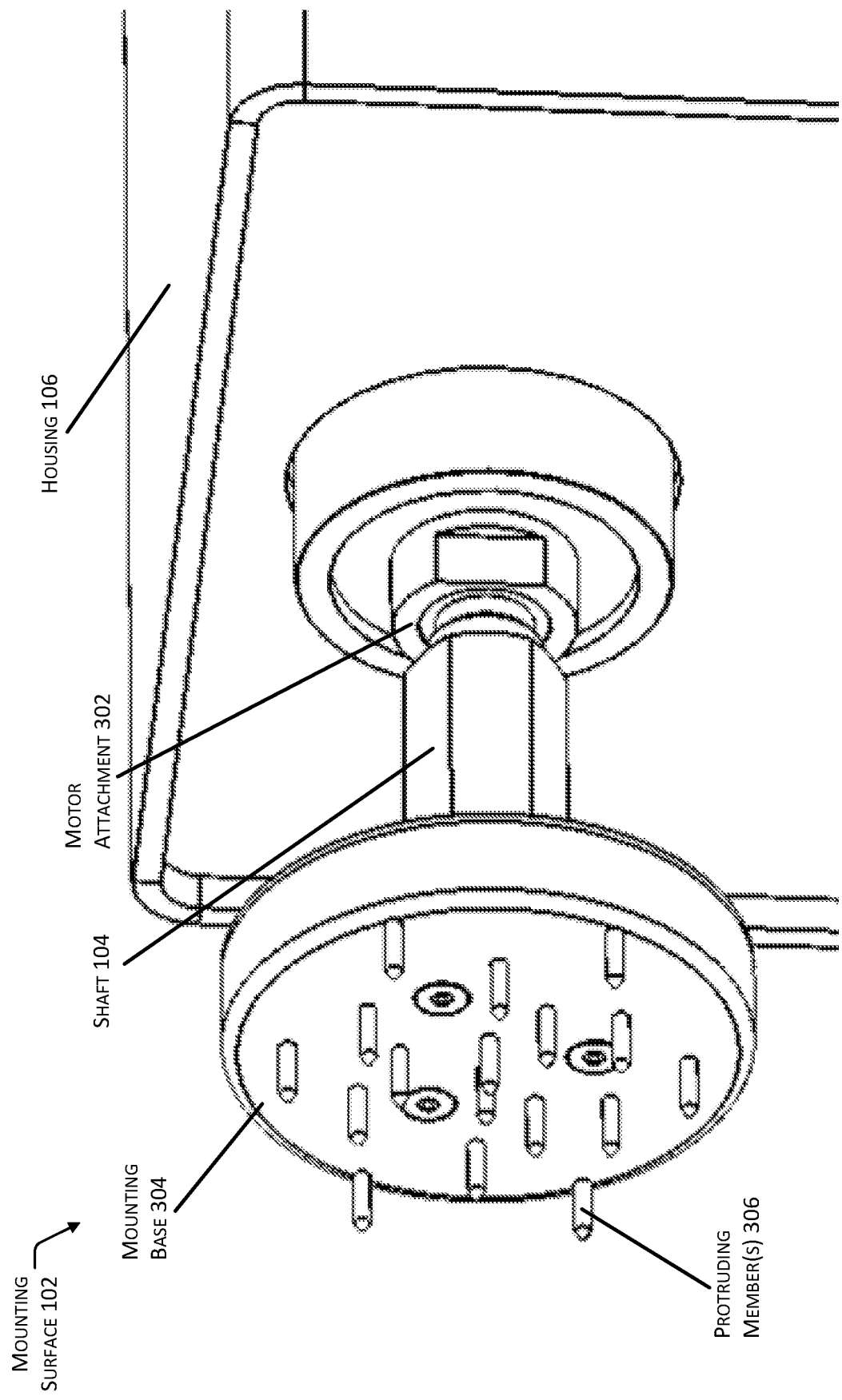
FIG. 3 depicts an implementation of the mounting surface shown in FIG. 1.

FIG. 3 depicts an implementation of the mounting surface 102 shown in FIG. 1. The shaft 104 engaged with a first side of the mounting surface 102 is shown engaged with the motor within the motor housing 106 via a motor attachment 302. For example, a protruding portion of the shaft 104 may engage a recession within the motor attachment 302. In some implementations, engagement between the shaft 104 and the motor attachment 302 may include a threaded engagement. In other implementations, the shaft 104 may be integral with the motor and may engage the mounting surface 102 via a threaded engagement or other type of engagement. In still other implementations, the shaft 104 may be integral with the mounting surface 102 and removable from the motor. Removability of one or more of the shaft 104 or the mounting surface 102 from the motor may enable replacement of the mounting surface 102 with one or more other mounting surfaces 102 having different features.

The mounting surface 102 is shown including a generally circular or disc-shaped mounting base 304, which engages the shaft 104. For example, the approximate center of the mounting base 304 may be aligned with the approximate center of the shaft 104, such that rotation of the shaft 104 about its longitudinal axis causes rotation of the mounting base 304 about its center. The mounting surface 102 may also include one or more protruding members 306, which may extend from a side of the mounting base 304 opposite the shaft 104. In some implementations, the protruding members 306 may include pointed, angled, wedge-shaped, or sharp members, such as nails, spikes, spines, and so forth, that are configured to at least partially penetrate into the body of a vegetable or other object to secure the object to the mounting surface 102. The mounting surface 102 may include any number and arrangement of protruding members 306. For example, the protruding members 306 may be evenly spaced on the mounting base 304, randomly spaced, spaced in a particular shape or pattern, and so forth. In some implementations, the protruding members 306 may extend generally perpendicular to the face of the mounting base 304. In other implementations, the protruding members 306 may extend at one or more non-perpendicular angles relative to the face of the mounting base 304. In some implementations, the protruding members 306 may be integral with the mounting surface 102. In other implementations one or more protruding members 306 may be removable from the mounting surface 102, such as to enable replacement of worn or damaged protruding members 306 or reconfiguration of the mounting surface 102 to engage different types of vegetables or other objects. For example, a first arrangement of a first type of protruding members 306 may be suitable for engaging a potato to the mounting surface 102, while a different arrangement of a different type of protruding members 306 may be suitable for engaging a zucchini to the mounting surface 102. Additionally, as discussed previously, in some implementations, one or more of the mounting surface 102 or shaft 104 may be removable from the remainder of the cutting apparatus 100 to enable replacement of the mounting surface 102 with a different mounting surface 102, which in some cases, may have different features suitable for engagement of different objects.

Figure 4:
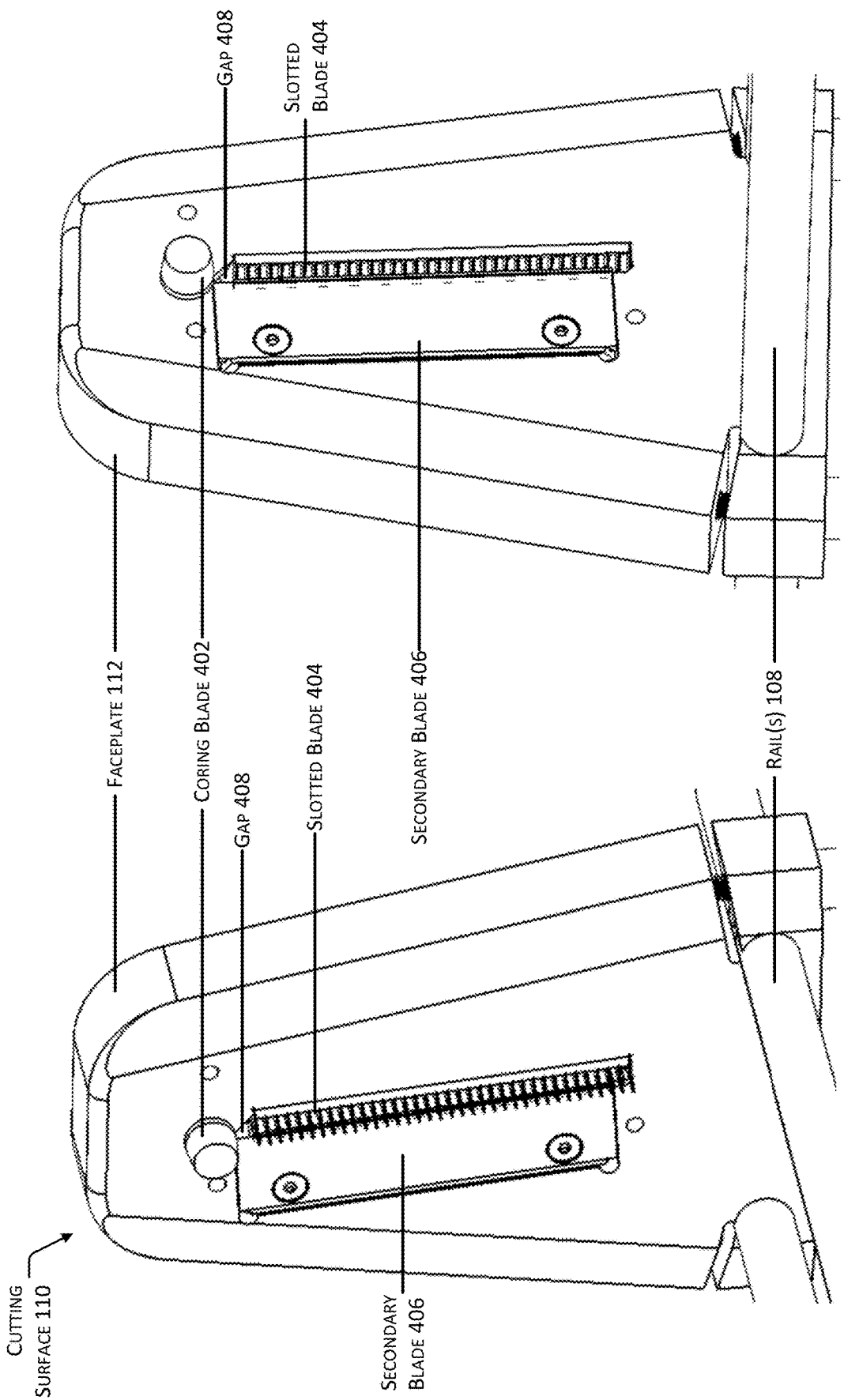
FIG. 4A depicts a first front perspective view and FIG. 4B depicts a second front perspective view depicting an implementation of the cutting surface and faceplate shown in FIG. 1.

FIG. 4 depicts two front perspective views depicting an implementation of the cutting surface 110 and faceplate 112 shown in FIG. 1. As described with regard to FIG. 1, the cutting surface 110 may include one or more blades that are supported within a faceplate 112 or other type of structure configured to engage or otherwise contain the blades. As shown in FIGS. 1 and 4, the rails 108, other support members, or other portions of the cutting apparatus 100 may engage a lower portion of the faceplate 112. For example, FIG. 4 depicts the rails 108 passing through corresponding holes or channels formed in the lower portion of the faceplate 112. In other implementations, other portions of the faceplate 112 may engage the rails 108 or another portion of the cutting apparatus 100. FIG. 4 depicts the faceplate 112 having a generally trapezoidal shape, however, in other implementations, faceplates 112 having other shapes or dimensions, such as rectangular, triangular, elliptical, or other polygonal shapes may be used.

The depicted cutting surface 110 includes three blades, however, in other implementations, more than three blades or fewer than three blades may be used. A coring blade 402 may be mounted in the faceplate 112 at a position opposite the center of the mounting surface 102 or axis of the shaft 104. For example, the coring blade 402 may include a generally cylindrical blade having a hollow center that encircles a hole extending through the faceplate 112. The coring blade 402 may have a length greater than that of other blades in the cutting surface 110, such that a vegetable engaged to the mounting surface 102 that is brought into contact with the cutting surface 110 first contacts the coring blade 402 before contacting other blades. Movement of the vegetable toward the cutting surface 110 may press a section of the vegetable (e.g., a "core") through the hollow center of the coring blade 402 and the hole in the faceplate 112, while the edge of the coring blade 402 penetrates through the portion of the vegetable surrounding the core. During operation of the cutting apparatus 100, contact between the core of the vegetable and the interior of the coring blade 402 may stabilize the vegetable by maintaining the lateral and vertical position of the vegetable relative to the faceplate 112, which may facilitate production of vegetable strands having a constant thickness.

A slotted blade 404 may be positioned adjacent to and extending in a radial direction from the coring blade 402. For example, FIG. 4 depicts the slotted blade 404 positioned below the coring blade 402 and extending in a downward direction relative thereto. However, in other embodiments, the slotted blade 404 may extend in any direction outward from the coring blade 402. The slotted blade 404 may include multiple cutting blades, each spaced apart from an adjacent cutting blade by a gap (e.g., a slot). The width of the gaps between the cutting blades may control the width of the vegetable strands that are produced by passing a vegetable through the cutting blades. For example, if the cutting blades are each spaced two millimeters from an adjacent cutting blade, rotation of a vegetable in contact with the slotted blade 404 may cause the cutting blades to form parallel slices of vegetable, each having a width of approximately two millimeters. In some implementations, the slotted blade 404 may be removable from the faceplate 112 to enable replacement thereof. For example, different slotted blades 404 having different types of cutting blades or different spacing between cutting blades may be used depending on the object to be cut and the desired width of the resulting strands.

As the vegetable or other object continues to rotate and is pressed toward the cutting surface 110 and faceplate 112, the portions of the vegetable cut by the slotted blade 404 may contact a secondary blade 406 positioned behind the cutting surfaces of the slotted blade 404. The position of the secondary blade 406 relative to the slotted blade 404 may define a gap 408 between the blades. The width of the gap 408 may affect the thickness of vegetable strands cut by the secondary blade 406. As the vegetable is rotated through the slotted blade 404, a portion of the sliced pieces of vegetable may contact the secondary blade 406. The secondary blade 406 may be oriented perpendicularly or at another non-parallel angle relative to the angle of the cutting blades of the slotted blade 404, such that the secondary blade 406 cuts the vegetable slices produced by the slotted blade 404 into strands as the vegetable slices pass through the gap 408. The strands may pass through the gap 408 to the rear side of the faceplate 112, where the strands may be collected for use. As the vegetable or other object is rotated, additional portions of the object may pass through the slotted blade 404, and then through the gap 408 after being cut by the secondary blade 406, increasing the length of the vegetable strands. A portion of the vegetable core, formed by the coring blade 402, may also pass through the center of the coring blade 402 and through the faceplate 112 to permit continued movement of the vegetable or other object toward the cutting surface 110.

Figure 5:
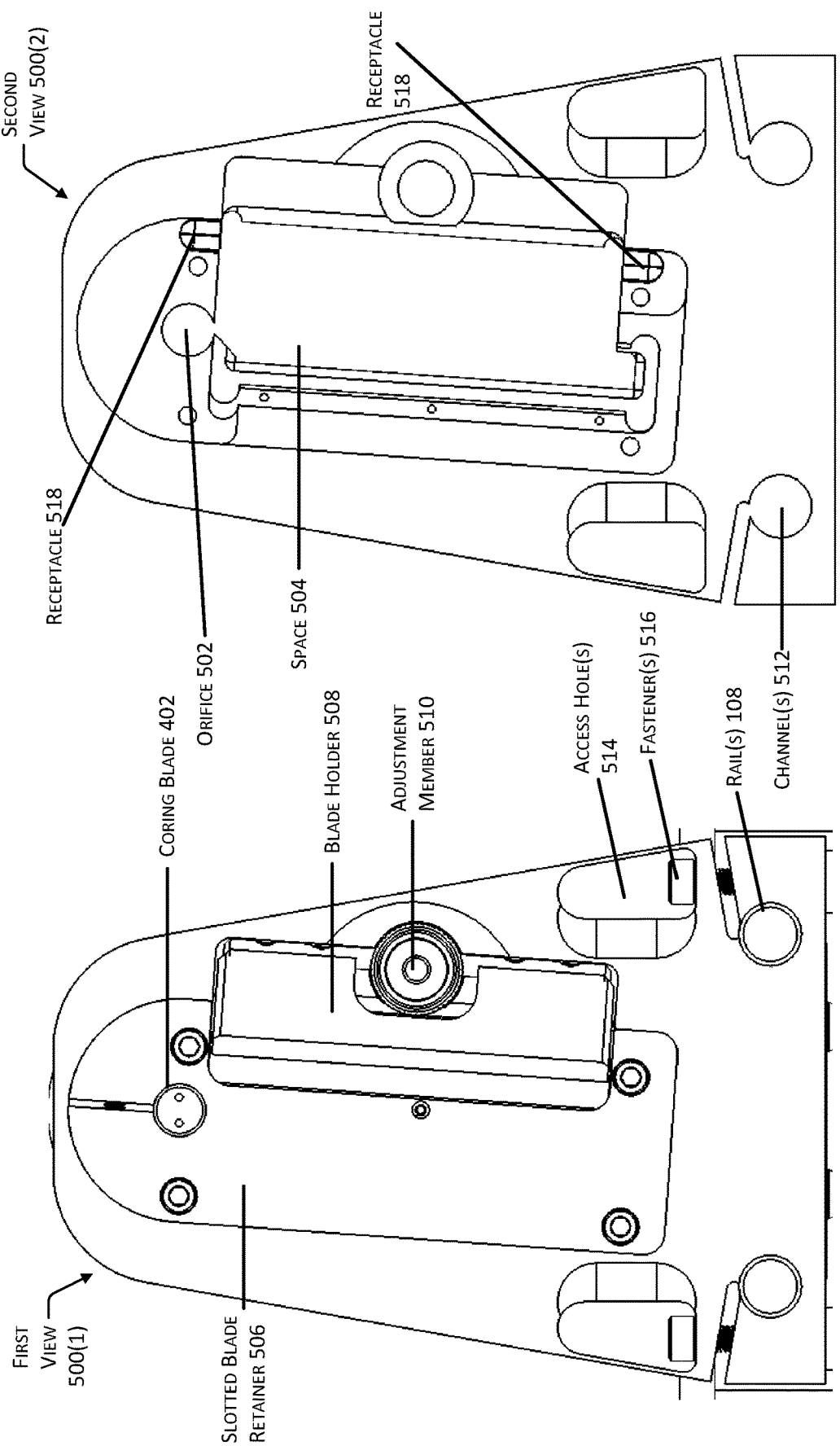
FIG. 5A depicts a first rear view and FIG. 5B depicts a second rear view of an implementation of the faceplate shown in FIGS. 1 an 4.

FIG. 5 depicts two rear views of the faceplate 112 in which a first view 500(1) depicts the faceplate 112 engaged with the blades described with regard to FIG. 4, while a second view 500(2) depicts the faceplate 112 with the blades removed. As described with regard to FIG. 4, a coring blade 402 may be positioned within an orifice 502 in the faceplate 112, such that movement of a vegetable toward the faceplate 112 may cause a core of the vegetable, formed by the edge of the coring blade 402, to pass through the hollow center of the coring blade 402 and the orifice 502. Contact between the core and the interior of the coring blade 402 or orifice 502 may stabilize the vegetable against lateral or vertical movement relative to the faceplate 112 and cutting surface 110. By permitting passage of the core, the orifice 502 may prevent the core from impeding movement of the vegetable toward the faceplate 112 as vegetable strands are produced using the slotted blade 404 and secondary blade 406.

The slotted blade 404 may be positioned within a corresponding space 504 in the faceplate 112. A slotted blade retainer 506, such as a bracket or other type of fastener or retention mechanism may be placed over the slotted blade 404 to retain the slotted blade 404 in a generally fixed position relative to the faceplate 112. For example, contact between the slotted blade retainer 506 and the slotted blade 404 may prevent movement of the slotted blade 404 relative to the faceplate 112 that may be caused by contact with a vegetable or operation of the cutting apparatus 100. In some implementations, the slotted blade retainer 506 may also contact at least a portion of the coring blade 402 to secure the coring blade 402 within the orifice 502. The slotted blade 404 may be placed within a first side of the space 504, while the secondary blade 406 may be placed within a second side of the space 504 opposite the slotted blade 404. A blade holder 508 may be used to retain the secondary blade 406 within the space 504. In some implementations, a portion of the slotted blade retainer 506 used to retain the slotted blade 404 may occupy at least a portion of the space 504 to prevent movement of the slotted blade 404 toward the secondary blade 406.

The blade holder 508 may be used to retain the secondary blade 406 in a generally stationary position relative to the faceplate 112 during operation of the cutting apparatus 100. For example, screws, bolts, rivets, or other types of fasteners may be used to secure the secondary blade 406 to the blade holder 508, while another fastener, such as an adjustment member 510, may be used to secure the blade holder 508 to the faceplate 112. The position of the secondary blade 406 within the faceplate 112 may define the width of the gap 408 through which vegetable strands are passed, thus controlling the thickness of the vegetable strands. In some implementations, the position of the secondary blade 406 relative to the faceplate 112 may be adjustable. For example, the adjustment member 510 may include a thumbscrew or similar structure configured to retain the blade holder 508 in a variety of positions relative to the faceplate 112. Operation of the adjustment member 510 may be used to modify the position of the blade holder 508, which may in turn modify the position of the secondary blade 406 attached to the blade holder 508. For example, movement of a thumbscrew toward the rear side of the faceplate 112 may narrow an angle between a front side of the faceplate 112 and the secondary blade 406, thus narrowing a width of the gap 408. Movement of the thumbscrew away from the faceplate 112 may increase the angle between the faceplate 112 and the secondary blade 406, increasing the width of the gap 408.

The faceplate 112 may also include one or more channels 512 for accommodating the rails 108, or another portion of the cutting apparatus 100, for securing the faceplate 112 thereto. FIG. 5 depicts the faceplate 112 including access holes 514 for enabling fasteners 516 to be accessed to secure the rails 108 within the channels 512.

Figure 6:
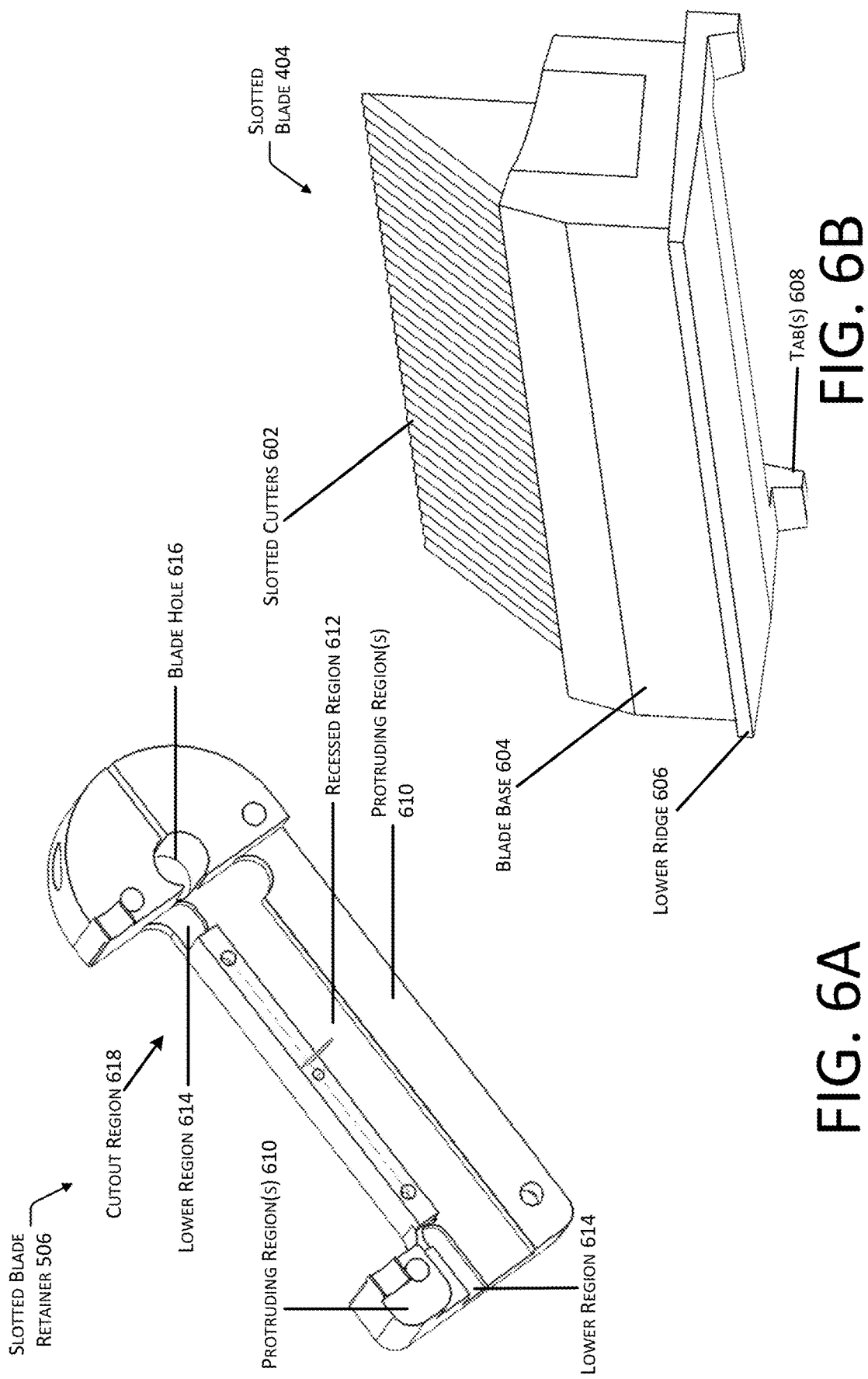
FIG. 6A depicts an implementation of a slotted blade retainer and FIG. 6B depicts an implementation of a slotted blade, shown in FIG. 5.

FIG. 6 depicts an implementation of a slotted blade 404 and slotted blade retainer 506, shown in FIG. 5. As described previously the slotted blade 404 may include a plurality of slotted cutters 602, each slotted cutter 602 spaced from each adjacent slotted cutter 602 by a short distance (e.g., a slot). The width of the slots between each slotted cutter 602 may control the width of the slices of vegetable or other object that are created as the object passes through the slotted cutters 602. The slotted cutters 602 may be secured to and extend from a blade base 604. A lower ridge 606 of the blade base 604, which may include one or more tabs 608 extending therefrom, may be used to position the slotted blade 404 within the slotted blade retainer 506. While the slotted blade 404 is shown having a generally rectangular shape, having slotted cutters 602 that extend generally perpendicularly from the blade base 604 and generally parallel to one another, other implementations may include a slotted blade 404 having any shape. Additionally the slotted cutters 602 may extend at any non-parallel angle relative to the blade base 604, including non-perpendicular angles.

The slotted blade retainer 506 is shown having a generally rectangular shape with a semi-circular end, however, in other implementations, the slotted blade retainer 506 may have any shape able to be engaged with the faceplate 112 and slotted blade 404. FIG. 6 depicts the slotted blade retainer 506 including multiple regions having different thicknesses. For example, multiple protruding regions 610 of the slotted blade retainer 506 may be thicker than other portions thereof, defining lands, protrusions, and walls that abut thinner portions of the slotted blade retainer 506. Continuing the example, the slotted blade retainer 506 may include a first protruding region 610 extending along a first side thereof and a second protruding region 610 positioned at a second side opposite the first side. A recessed region 612 is shown positioned between the protruding regions 610 at each side of the slotted blade retainer 506. The recessed region 612 may therefore include a groove, recession, channel, or other similar feature, defined by sidewalls that abut the adjacent protruding regions 610. When the slotted blade 404 is positioned within the slotted blade retainer 506, the lower ridge 606 may occupy the recessed region 612. One or more lower regions 614 proximate to the recessed region 612 may have a thickness less than that of the recessed region 612. The lower regions 614 may be positioned in the body of the slotted blade retainer 506 at a location complementary to that of the tabs 608 extending from the slotted blade 404, such that when the lower ridge 606 is placed in the recessed region 612, the tabs 608 may occupy at least a portion of the lower regions 614. Contact between the tabs 608 and the walls of the lower regions 614, and contact between the sides of the lower ridge 606 and the walls of the recessed region 612 may limit movement of the slotted blade 404 relative to the slotted blade retainer 506. The slotted blade 404 may be engaged with the slotted blade retainer 506 through use of one or more fasteners that may extend through holes in the slotted blade retainer 506 to engage the slotted blade 404. In other implementations, other types of engagement, such as clips, clasps, suction, magnetism, adhesive, or a force or interference fit may be used to engage the slotted blade 404 with the slotted blade retainer 506.

While FIG. 6 depicts the slotted blade 404 having a single lower ridge 606 and two tabs 608, and the slotted blade retainer 506 having a single recessed region 612 and two lower regions 614, any combination of complementary raised and lowered regions may be used to position the slotted blade 404 relative to the slotted blade retainer 506. For example, the slotted blade 404 may include one or more recessions within which a protruding portion of the slotted blade retainer 506 may be positioned.

In some implementations, the slotted blade retainer 506 may also include a blade hole 616 that may align with the orifice 502 of the faceplate 112 when the slotted blade retainer 506 is positioned therein. The blade hole 616 may be used to accommodate passage of the coring blade 402 and a core of vegetable material that passes through the hollow center of the coring blade 402 and the orifice 502. In some implementations, the slotted blade retainer 506 may also be used to retain the coring blade 402 in a generally fixed position relative to the slotted blade retainer 506 and faceplate 112. For example, one or more screws or other types of fasteners may be used to secure the coring blade 402 within the blade hole 616. The slotted blade retainer 506 may also include a cutout region 618 formed in a side thereof to accommodate placement of the secondary blade 406 and blade holder 508, as shown in FIG. 5. For example, when positioned within the faceplate 112, the secondary blade 406 and blade holder 508 may occupy at least a portion of the space defined by the cutout region 618.

Figure 7:
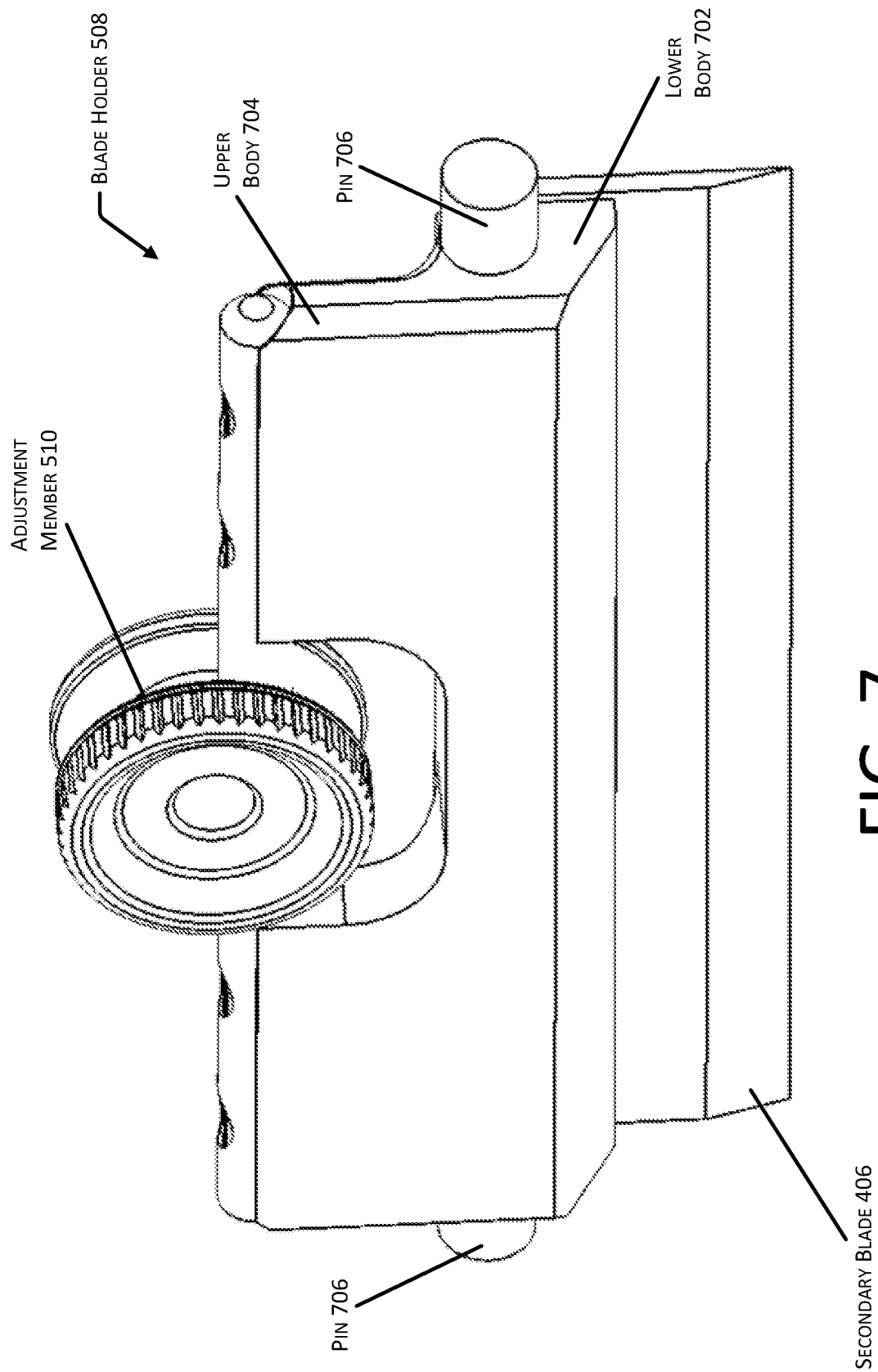
FIG. 7 depicts an implementation of a secondary blade and blade holder, shown in FIG. 5.

FIG. 7 depicts an implementation of a secondary blade 406 and blade holder 508, shown in FIGS. 5A and 5B. The blade holder 508 may include a lower body 702 that engages the secondary blade 406, such as through use of one or more fasteners or other fastening mechanisms, such as adhesive, magnetic, or suction-based fastening techniques. The blade holder 508 may also include an upper body 704 adjacent to the lower body 702 that engages the faceplate 112 to secure the blade holder 508 and attached secondary blade 406 relative to the faceplate 112. In some implementations, the blade holder 508 may be secured to the faceplate 112 in a manner that permits movement of the blade holder 508 relative to the faceplate 112. For example, one or more pins 706 extending from the blade holder 508 may engage corresponding receptacles 518 in the faceplate 112, shown in FIG. 5B. The adjustment member 510, shown in FIG. 5, may also engage a portion of the faceplate 112. Movement of the adjustment member 510 may cause the adjustment member 510 to apply a force to the faceplate 112, causing the blade holder 508 to pivot about the axis of the pins 706, thereby changing the angle of the secondary blade 406 relative to the faceplate 112. Movement of the secondary blade 406 in this manner may change the width of the gap 408 in the faceplate 112, shown in FIG. 4, thereby controlling the thickness or shape of the vegetable strands that are formed when cut by the secondary blade 406.

Figure 8:
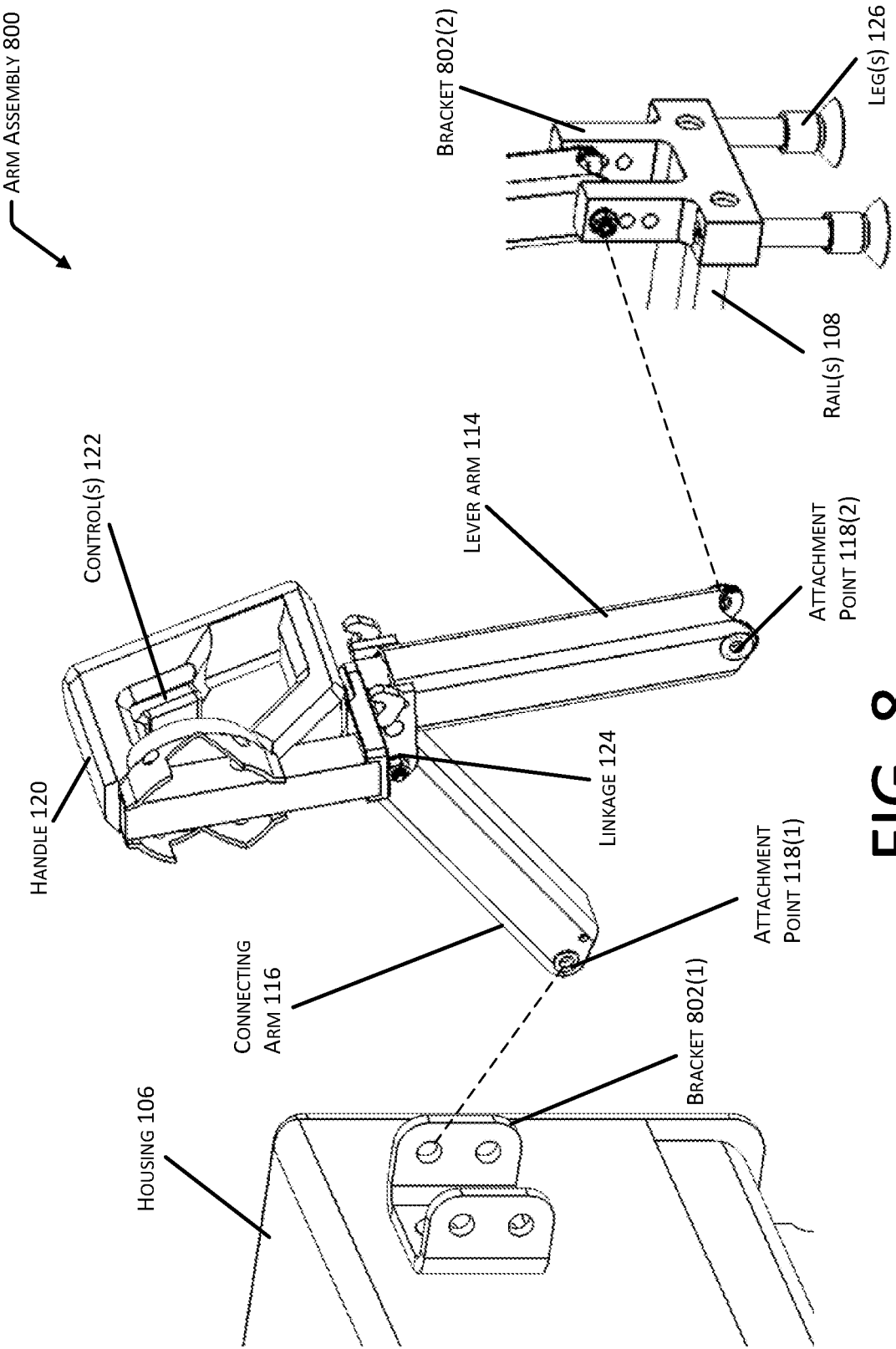
FIG. 8 depicts an implementation of an arm assembly that may be used to move the motor housing and attached mounting surface relative to the faceplate and cutting surface.

FIG. 8 depicts an implementation of an arm assembly 800 that may be used to move the motor housing 106 and attached mounting surface 102 relative to the faceplate 112 and cutting surface 110. As described with regard to FIG. 1, a lever arm 114 may be used to transmit a user-applied force to an object secured to the mounting surface 102. The angle of the lever arm 114 relative to the faceplate 112 and cutting surface 110 may affect the portion of the user-applied force that is transmitted in a lateral direction, toward the faceplate 112, and the portion that is transmitted in a vertical direction. For example, if the entirety of a user-applied force were transmitted in a lateral direction to press a soft vegetable against the cutting surface 110, the vegetable may be crushed and the function of the cutting surface 110 would be impaired. As another example, if the entirety of a user-applied force were transmitted in a lateral direction to press a hard vegetable against the cutting surface 110, one or more components of the cutting surface 110 may become damaged. Additionally, when small variations in the user-applied force occur, if the entirety of the user-applied force is transmitted in a lateral direction, these variations may significantly affect the force with which a vegetable contacts the cutting surface 110, which may cause the resulting vegetable strands to have a varying thickness as the user-applied force changes. Use of an arm assembly 800 that transmits only a portion of the user-applied force in a lateral direction may reduce the effect of variations in the user-applied force on the thickness of the resulting vegetable strands.

As described with regard to FIG. 1, the arm assembly 800 may include a lever arm 114 engaged with a connecting arm 116 via a linkage 124. The linkage 124 may be configured to permit rotational movement about the axis of the connection at the linkage 124, enabling the lever arm 114 and connecting arm 116 to pivot relative to one another, such as to change the angle between the arms. A handle 120 may be positioned at or near the linkage 124. In other implementations, a handle 120 may be placed at another location on the arm assembly 800, or a handle 120 may be omitted. In some implementations, the handle 120 may include one or more controls 122 for actuating the motor of the cutting apparatus 100, such as to provide rotational motion to a vegetable or other object engaged to the mounting surface 102. In other implementations, controls 122 may be located on a different portion of the arm assembly 800, a different portion of the cutting apparatus 100, or remote from the cutting apparatus 100.

The connecting arm 116 may engage a bracket 802(1) associated with a side of the housing 106 opposite the mounting surface 102 at a first attachment point 118(1). The engagement between the connecting arm 116 and the bracket 802(1) may be configured to permit rotational movement (e.g., pivoting) of the connecting arm 116 relative to the housing 106, thus enabling the angle between the connecting arm 116 and the housing 106 to change as the arm assembly 800 moves. The lever arm 114 may engage a bracket 802(2) associated with the rail(s) 108 or another portion of the cutting apparatus 100 spaced apart from the cutting surface 110. The engagement between the connecting arm 116 and the bracket 802(2) may be configured to permit rotational movement (e.g., pivoting) of the connecting arm 116 relative to the cutting apparatus 100, thus enabling the angle of the lever arm 114 relative to the cutting apparatus 100 to change as the arm assembly 800 moves. Use of connections that permit movement of the connecting arm 116 and lever arm 114 relative to the cutting apparatus 100 and relative to one another may further prevent variations in a user-applied force from significantly affecting the dimensions or shape of vegetable strands formed at the cutting surface 110.

Those having ordinary skill in the art will readily recognize that certain structures, steps, or operations illustrated in the figures or described in this disclosure may be eliminated, combined, or performed in an alternate order. Any steps or operations may be performed serially or in parallel. Furthermore, the order in which the operations are described is not intended to be construed as a limitation.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A cutting apparatus comprising:
a mounting surface configured to engage an object;
a motor coupled to the mounting surface, wherein a first force from the motor rotates the mounting surface and the object about a rotational axis;
a faceplate that includes a cutting surface, wherein the mounting surface is movable, under application of a second force, in a first direction toward the cutting surface and a second direction away from the cutting surface;
a coring blade having a hollow center that at least partially encircles an orifice extending through the faceplate, wherein the coring blade is positioned approximately coaxial with the rotational axis;
a slotted blade positioned within a first side of a space that extends through the faceplate and extending radially from the coring blade in a non-parallel direction relative to the rotational axis;
a secondary blade having a first end with a cutting edge and a second end opposite the first end, the secondary blade positioned within a second side of the space adjacent to the slotted blade, wherein a portion of the space between the slotted blade and the secondary blade defines a gap between the slotted blade and the secondary blade and a width of the gap determines a thickness of portions of the object cut by the secondary blade, and wherein a position of the secondary blade relative to the slotted blade is adjustable to control the width of the gap;
a holder for the secondary blade, the holder including one or more pins positioned adjacent to the second end of the secondary blade, wherein the one or more pins engage the faceplate, and the holder is movable relative to the faceplate about a rotational axis defined by the one or more pins to move the cutting edge of the secondary blade relative to the slotted blade;
an adjustment member that engages the holder to a portion of the faceplate, wherein movement of the adjustment member applies a third force to the faceplate to cause the holder to pivot about the rotational axis defined by the one or more pins; and
an arm assembly engaged with the mounting surface and configured to transmit a first portion of the second force to the mounting surface to urge the mounting surface in one or more of the first direction or the second direction, wherein the arm assembly is engaged to an attachment point that is configured to cause the arm assembly to transmit the first portion of the second force in the first direction and to transmit a second portion of the second force away from the first direction.

2. The cutting apparatus of claim 1, further comprising a retainer positioned proximate to a rear surface of the slotted blade, wherein contact between the slotted blade and the retainer prevents movement of the slotted blade in the first direction.

3. The cutting apparatus of claim 2, wherein the retainer includes one or more side surfaces positioned proximate to one or more sides of the slotted blade, and wherein contact between the one or more sides of the slotted blade and the retainer prevents movement of the slotted blade in one or more lateral directions that are non-parallel to the first direction.

4. The cutting apparatus of claim 1, wherein the mounting surface includes a base having a first side engaged to the motor and a second side having one or more protruding members extending from the second side, and wherein the one or more protruding members are configured to at least partially penetrate the object to retain the object in association with the mounting surface.

5. The cutting apparatus of claim 1, further comprising one or more rails engaged to the faceplate and the mounting surface, wherein movement of the mounting surface in the first direction and the second direction moves at least a portion of the cutting apparatus along the one or more rails.

6. The cutting apparatus of claim 5, further comprising:
a housing at least partially enclosing the motor and engaged to the one or more rails, wherein the housing is movable along the one or more rails in the first direction and movement of the housing moves the mounting surface and the object toward the cutting surface.

7. The cutting apparatus of claim 6, further comprising one or more stops positioned on at least one rail of the one or more rails, wherein contact between the housing and the one or more stops limits movement of the housing and the mounting surface toward the cutting surface.

8. The cutting apparatus of claim 1, further comprising:
at least two legs associated with a base of the cutting apparatus, wherein the at least two legs are configured to engage the cutting apparatus to a support surface in a horizontal orientation and the first direction is parallel to the support surface; and
wherein the arm assembly includes a first arm engaged with the mounting surface and a second arm engaged with a portion of the cutting apparatus spaced apart from the mounting surface.

9. The cutting apparatus of claim 8, wherein the first arm is movably connected to the second arm to enable an angle between the first arm and the second arm to change during movement of the arm assembly.

10. The cutting apparatus of claim 8, wherein the first arm is movably connected to the mounting surface to enable an angle between the first arm and the mounting surface to change during movement of the arm assembly.

11. The cutting apparatus of claim 8, wherein the second arm is movably connected to the portion of the cutting apparatus to enable an angle between the second arm and the portion of the cutting apparatus to change during movement of the arm assembly.

12. The cutting apparatus of claim 1, wherein the slotted blade has a first axis that is perpendicular to at least one cutting edge of the slotted blade and the secondary blade has a second axis that is parallel to the cutting edge of the secondary blade and parallel to the first axis.

13. A cutting apparatus comprising:
a mounting surface configured to engage an object;
a faceplate that includes a cutting surface including one or more blades, wherein the one or more blades include:
a coring blade having a hollow center that at least partially encircles an orifice extending through the faceplate;
a slotted blade having a first axis perpendicular to at least one cutting edge of the slotted blade; and
a secondary blade having a first end with a cutting edge, a second end opposite the first end, and a second axis parallel to the cutting edge of the secondary blade and parallel to the first axis, wherein a position of the secondary blade is adjustable relative to the slotted blade to control a width of a gap between the secondary blade and the slotted blade;
a holder for the secondary blade, wherein the holder engages the faceplate and is moveable relative to the faceplate about a rotational axis that is adjacent to the second end of the secondary blade to move the cutting edge of the secondary blade relative to the slotted blade;
an adjustment member positioned on the holder, wherein the adjustment member applies a force to the faceplate to cause movement of the holder to pivot the cutting edge of the secondary blade about the rotational axis; and
a motor coupled to the mounting surface via a rotatable shaft, wherein the motor is configured to apply a first force to the mounting surface by rotating the rotatable shaft about an axis to cause rotation of the mounting surface and the object engaged to the mounting surface;
wherein the mounting surface is movable toward the cutting surface under application of a second force.

14. The cutting apparatus of claim 13, further comprising:
one or more legs configured to engage the cutting apparatus in a horizontal orientation to a support surface that is generally perpendicular to the cutting surface; and
an arm assembly coupled to the mounting surface, wherein the arm assembly receives the second force and transmits a first portion of the second force in a first direction parallel to the support surface and toward the cutting surface and a second portion of the second force in a second direction different than the first direction.

15. The cutting apparatus of claim 13, wherein the faceplate includes a space extending through the faceplate, the slotted blade is positioned in a first side of the space, and the secondary blade is positioned in a second side of the space adjacent to the slotted blade, and wherein a portion of the space between the slotted blade and the secondary blade defines the gap between the slotted blade and the secondary blade and the width of the gap determines a thickness of portions of the object cut by the secondary blade.

16. The cutting apparatus of claim 13 further comprising:
one or more protrusions extending from the holder that engage the holder to a portion of the faceplate, wherein the adjustment member is spaced apart from the one or more protrusions and the rotational axis is parallel to the cutting edge of the secondary blade.

17. A cutting apparatus comprising:
a faceplate that includes a cutting surface and a space extending through the cutting surface;
a slotted blade positioned in a first side of the space, wherein the slotted blade has a first axis that is perpendicular to at least one cutting edge of the slotted blade;
a secondary blade having a first end with a cutting edge and a second end opposite the first end, the secondary blade positioned in a second side of the space adjacent to the slotted blade, wherein a second axis of the secondary blade is parallel to the cutting edge of the secondary blade and parallel to the first axis, and wherein a position of the secondary blade relative to the slotted blade is moveable to control a width of a gap between the secondary blade and the slotted blade;
a holder for the secondary blade, wherein the holder engages the secondary blade to the faceplate at a location on the holder that is adjacent to the second end of the secondary blade, and wherein the holder is moveable relative to the faceplate about a rotational axis to move the cutting edge of the secondary blade relative to the slotted blade;
an adjustment member that engages a portion of the faceplate and applies a force to the faceplate to cause movement of the holder to pivot the cutting edge of the secondary blade about the rotational axis; and
a mounting surface configured to engage an object, wherein the mounting surface is rotatable to rotate the object and is moveable toward and away from the cutting surface to bring the object into contact with the slotted blade and the secondary blade, and wherein rotation of the mounting surface rotates the object to cause the slotted blade and the secondary blade to cut the object.

18. The cutting apparatus of claim 17, further comprising:
a motor engaged with the mounting surface to provide a rotational force to the mounting surface to cause rotation of the mounting surface;
one or more legs configured to engage the cutting apparatus in a horizontal orientation to a support surface that is generally perpendicular to the cutting surface; and
an arm assembly engaged with the mounting surface to receive a lateral force, wherein the arm assembly transmits a first portion of the lateral force in a first direction parallel to the support surface and toward the cutting surface and a second portion of the lateral force in a second direction different than the first direction.

19. The cutting apparatus of claim 17, further comprising:
one or more protrusions extending from the holder that engage one or more receptacles within the faceplate, wherein the portion of the faceplate engaged by the adjustment member is spaced apart from the one or more receptacles and the rotational axis is parallel to the cutting edge of the secondary blade.

* * * * *